United States Patent
Kawakami

(10) Patent No.: US 9,951,799 B2
(45) Date of Patent: Apr. 24, 2018

(54) FLUID PRESSURE CYLINDER AND TWIST-TYPE CLAMP DEVICE TECHNICAL FIELD

(71) Applicant: PASCAL ENGINEERING CORPORATION, Hyogo (JP)

(72) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 543 days.

(21) Appl. No.: 14/438,441

(22) PCT Filed: Sep. 20, 2013

(86) PCT No.: PCT/JP2013/075447
§ 371 (c)(1),
(2) Date: Apr. 24, 2015

(87) PCT Pub. No.: WO2014/077030
PCT Pub. Date: May 22, 2014

(65) Prior Publication Data
US 2015/0285280 A1    Oct. 8, 2015

(30) Foreign Application Priority Data

Nov. 13, 2012  (JP) ................................. 2012-249234
Dec. 11, 2012  (JP) ................................. 2012-270202

(51) Int. Cl.
*F15B 15/26*    (2006.01)
*F15B 15/28*    (2006.01)
(Continued)

(52) U.S. Cl.
CPC .......... *F15B 15/2838* (2013.01); *B23Q 3/082* (2013.01); *B23Q 17/005* (2013.01);
(Continued)

(58) Field of Classification Search
CPC .. F15B 15/2807; F15B 15/06; F15B 15/2838; F15B 15/063; B25B 5/062; B23Q 17/005; B23Q 3/082
See application file for complete search history.

(56) References Cited

U.S. PATENT DOCUMENTS

| | | | | |
|---|---|---|---|---|
| 6,663,093 B2 * | 12/2003 | Yonezawa | ............... | B25B 5/062 269/24 |
| 9,511,466 B2 * | 12/2016 | Kawakami | .......... | F15B 15/2807 |
| 2009/0152784 A1 * | 6/2009 | Yonezawa | ............... | B25B 5/062 269/32 |

OTHER PUBLICATIONS

CD-ROM of the specification and drawings annexed to the request of Japanese Utility Model Application No. 33813/1991 (Laid-open No. 58910/1993) (Koganei Corp.) Aug. 3, 1993 (Aug. 3, 1993), entire text; all drawings (Family: none) JPH05-58910.

(Continued)

*Primary Examiner* — F. Daniel Lopez
*Assistant Examiner* — Abiy Teka
(74) *Attorney, Agent, or Firm* — Norris McLaughlin & Marcus, P.A.

(57) ABSTRACT

An open/shut valve mechanism for detecting that a piston member of a hydraulic pressure cylinder has reached an unclamp position comprises: a valve body reception hole that communicates with a unclamp hydraulic pressure operating chamber, a valve body movably received in the valve body reception hole and having an annular concave engagement portion on its external circumferential portion; a spherical body that is movably installed in a cylinder main body and that can engage with the concave engagement portion; and an engagement portion that is formed on an auxiliary rod and with which the spherical body can engage; and when hydraulic pressure is charged into the unclamp hydraulic pressure operating chamber and the piston member has reached its unclamp position, the valve body (Continued)

receives the hydraulic pressure, a portion of the spherical body engages to the engagement portion and the valve body changes over to the valve closed position; and, when the piston member has shifted from its unclamp position, the spherical body engages with the annular concave engagement portion without engaging to the engagement portion, so that the valve body is held in its open position.

10 Claims, 19 Drawing Sheets

(51) Int. Cl.
  *B23Q 3/08*    (2006.01)
  *B23Q 17/00*   (2006.01)
  *B25B 5/06*    (2006.01)
  *F15B 15/06*   (2006.01)

(52) U.S. Cl.
  CPC .............. *B25B 5/062* (2013.01); *F15B 15/06* (2013.01); *F15B 15/2807* (2013.01); *F15B 2211/6306* (2013.01)

(56) References Cited

OTHER PUBLICATIONS

Microfilm of the specification and drawings annexed to the request of Japanese Utility Model Application No. 124174/1980 (Laid-open No. 46106/1982) (Toyota Motor Co., Ltd.) Mar. 31, 1982 (Mar. 31, 1982), entire text; all drawings (Family: none) JP 57-046106.

* cited by examiner

FLUID PRESSURE CYLINDER AND TWIST-TYPE CLAMP DEVICE TECHNICAL FIELD

TECHNICAL FIELD

The present invention relates to a fluid pressure cylinder and to a twist-type clamp device with which, in particular, when a piston member has reached a predetermined movement limit position, the position of the piston member can be detected via change of an air pressure that is changed over by an open/shut valve mechanism that operates together with the operation of the piston member to change over the state of communication of an air passage within a main body of the clamp.

BACKGROUND OF THE INVENTION

A fluid pressure cylinder employed in a clamp device that clamps an object to be clamped, such as a workpiece etc. that is to be subjected to mechining, and that includes a cylinder main body, a piston member that is fitted in the cylinder main body so as to move freely forward and backward therein, and a fluid pressure operation chamber for driving the piston member to at least one of its advance side and its retraction side, is per se known from the prior art.

Now, various rod position detection techniques have been implemented in practice for detecting that the piston member of the fluid pressure cylinder is in its forward limit position in the axial direction, or is in its backward limit position, or is in an intermediate position.

For example, the clamp device of Patent Document #1 detects the position of the piston rod with a pressure sensor that detects the fluid pressure supplied to the fluid pressure cylinder and with a two position sensor that detects a raised position and a lowered position of a detected element on the lower end portion of an operating rod that projects from the piston member of the fluid pressure cylinder to the exterior.

In the clamp device of Patent Document #2, a construction is provided in which a mechanism that operates together with the raising and lowering of an output rod of the fluid pressure cylinder and that opens and closes an air passage is provided externally to one end of the cylinder main body, this mechanism thus being capable of detecting the raised position and the lowered position of the output rod.

And, in the clamp device of Patent Document #3, a workpiece reception stand that receives and supports the object to be clamped is provided independently. The workpiece reception stand comprises a pad member in which an air ejection outlet is formed, and an outer tube member that elastically holds the pad member up toward the object to be clamped. Pressurized air is blown out of the air ejection outlet while the pad member is in a projected position, and, when the clamp device is driven to perform clamping and the pad member is pressed by the object to be clamped and accordingly retracts, the air ejection outlet is blocked by the outer tube member so that the pressure of the pressurized air rises, and the fact that the device has gone into the clamped state is thereby detected.

Patent Document #1: JP Laid Open Pat. Publication 2001-87991.
Patent Document #2: JP Laid Open Pat. Publication 2003-305626.
Patent Document #3: JP Laid Open Pat. Publication 2009-125821.

SUMMARY OF THE INVENTION

Since, with the clamp device of Patent Document #1, the operating rod of the fluid pressure cylinder is projected from the piston member to the exterior, and the raised position and the lowered position of the detected element that is provided at the lower end portion of the operating rod are detected by the two-position sensor, and since a detection space is required for downward movement of the detected element of the fluid pressure cylinder and for installation of the position sensor, accordingly there is a problem that the clamp device (i.e., the fluid pressure cylinder) is increased in size.

With the clamp device of Patent Document #2, the mechanism for detecting the raised position and the lowered position of the output rod is built externally to the clamp main body. Due to this, in a similar manner to the clamp device of Patent Document #1, it is not possible to make the clamp device in a compact form, since it becomes necessary to provide the detection space externally to the clamp main body.

And since, during the unclamped state, the air ejection outlet of the work reception stand of the clamp device of Patent Document #3 opens at a location neighboring the clamp device and neighboring the object to be clamped, accordingly there is a possibility that chips or swarf from mechining or coolant (i.e., cutting fluid) may get into the air ejection outlet and block it up.

The object of the present invention is to provide a fluid pressure cylinder and a twist-type clamp device, that can detect that a piston member has been shifted to its movement limit position via fluid pressure, whose operational reliability is excellent, and that, with a simple structure, can open an open/shut detection valve mechanism so as to operate together with a piston member.

The present let invention presents a fluid pressure cylinder comprising a cylinder main body in which a cylindrical hole is formed, a piston member having a piston portion movably received in the cylindrical hole and an output rod that extends from the piston portion to the exterior of the cylinder main body, and a fluid pressure operation chamber formed in the cylindrical hole, characterized by comprising:

an auxiliary rod that extends from the piston portion in an opposite direction to the output rod; a rod insertion hole that is formed in the cylinder main body so as to communicate with the fluid pressure operation chamber and into which the auxiliary rod can be inserted; a first open/shut detection valve mechanism, installed in the cylinder main body; and a first fluid passage formed in the cylinder main body so as to be opened and closed by the first open/shut detection valve mechanism;

wherein the first open/shut detection valve mechanism comprises: a first valve body reception hole that is formed parallel to an axis of the cylindrical hole in the cylinder main body, and is communicated with the fluid pressure operation chamber; a first valve body that is movably received in the first valve body reception hole and has a first concave engagement portion on an external circumferential portion thereof; a first spherical body that is movably fitted in the cylinder main body and is capable of engaging to the first concave engagement portion; and a first engagement portion formed on the auxiliary rod and to which the first spherical body can engage;

wherein, when fluid pressure is charged into the fluid pressure operation chamber and the piston member has reached its movement limit position, the first valve body receives a fluid pressure in the fluid pressure operation chamber, and a portion of the first spherical body is engaged to the first engagement portion and the first valve body is changed over to a valve-closed position; and when the piston member has shifted from its movement limit position, the first spherical body does not engage with the first engagement portion and engages with the first concave engagement portion so that the first valve body maintains a valve-open position.

The present 1st invention may have the following configurations.

As 1st example, preferably, a closed state of the first open/shut detection valve mechanism is detected via fluid pressure supplied to the first fluid passage.

As 2nd example, preferably, the first engagement portion is formed as an annulus on an external circumferential portion of the auxiliary rod.

The present 2nd invention presents a twist-type clamp device, characterized in that a twisting mechanism is provided to the auxiliary rod and the cylinder main body of the fluid pressure cylinder according to the present 1st invention, the twisting mechanism operating together with a forward and backward movement of the output rod to twist the output rod through a set angle around its axis, and in that a clamp arm is provided at an end portion of the output rod.

The present 2nd invention may have the following configurations.

As 1st example, preferably, the output rod is formed so as to extend from the piston portion upward to the exterior of the cylinder main body; and the fluid pressure operation chamber is formed on a lower side of the piston portion, and the movement limit position of the piston member is an unclamp position in which the piston portion is positioned at its upper limit position.

As 2nd example, preferably, there are provided with a second open/shut detection valve mechanism, installed in the cylinder main body; and a second fluid passage formed in the cylinder main body and opened and closed by a second open/shut detection valve mechanism; wherein the second open/shut detection valve mechanism comprises: a second valve body reception hole that is formed parallel to the axis of the cylindrical hole in the cylinder main body, and is communicated with the fluid pressure operation chamber; a second valve body that is movably received in the second valve body reception hole and has a second concave engagement portion on an external circumferential portion thereof a second spherical body that is movably fitted in the cylinder main body and is capable of engaging to the second concave engagement portion; a second engagement portion formed on the auxiliary rod and to which the second spherical body can engage; and a compression spring that biases the second valve body toward a closed position;

wherein, when the piston member is in its unclamp position, the second spherical body does not engage with the second engagement portion and engages with the second concave engagement portion so that the second valve body maintains a valve-open position; while, when the piston member is in its clamp position in which the piston member has been lowered below its unclamp position, the second spherical body engages with the second engagement portion and the second valve body is changed over to its valve-closed position.

As 3rd example, preferably, the second engagement portion consists of a single vertical groove formed on an external circumferential portion of the auxiliary rod.

As 4th example, preferably, the second engagement portion consists of two vertical grooves formed in sequence along a vertical direction on an external circumferential portion of the auxiliary rod.

As 5th example, preferably, an installation hole into which a lower portion of the clamp main body is inserted from above and installed is formed in a base member to which the twist-type clamp device is fitted; the installation hole consists of a lower installation hole portion and an upper installation hole portion that is of slightly larger diameter than the lower installation hole portion; and a lower end side portion of the clamp main body and a seal member fitted on an external circumferential portion of the lower end side portion of the clamp main body is installed in the lower installation hole portion.

As 6th example, preferably there is provided with a compression spring that biases the first valve body toward its open side.

According to the present 1st invention, the auxiliary rod, the rod insertion hole, the first open/shut detection valve mechanism, and the first fluid passage are provided to the fluid pressure cylinder that has the fluid pressure operation chamber; and the first open/shut detection valve mechanism comprises the first valve body reception hole that is formed in the cylinder main body and that is communicated with the fluid pressure operation chamber, the first valve body that has the first concave engagement portion, the first spherical body that is movably installed in the cylinder main body and that is capable of engaging to the first concave engagement portion, and the first engagement portion formed on the auxiliary rod and to which the first spherical body can engage. And, when fluid pressure is charged into the fluid pressure operation chamber and the piston member reaches its movement limit position, along with the first valve body experiencing the fluid pressure in the fluid pressure operation chamber, also the first spherical body is engaged with the first engagement portion; and, when the first valve body is changed over to its closed position and the piston member has shifted from its movement limit position, it is arranged for the first spherical body no longer to be engaged with the first engagement portion but to engage with the first concave engagement portion, and for the first valve body to be held in its open position.

Thus, since the first open/shut detection valve mechanism is shifted to its closed position and the first fluid passage is intercepted when the piston member is shifted to its movement limit position, accordingly it is possible to detect the fact that the piston member has shifted to its movement limit position via the first open/shut detection valve mechanism and the fluid pressure that is supplied to the first fluid passage. Moreover, since the first valve body is biased to go to its closed position by the fluid pressure in the fluid pressure operation chamber, accordingly the valve closing performance and the operational reliability of the first open/shut detection valve mechanism are excellent.

Since the first open/shut valve mechanism is installed in the cylinder main body, it is possible to make the fluid pressure cylinder more compact. And, since the first valve body of the first open/shut detection valve mechanism has the first concave engagement portion on its external circumferential portion, and since it is arranged for the valve to be opened by the first spherical body not engaging with the first engagement portion but engaging with the first concave engagement portion, while the valve is closed by the first spherical body engaging with the first engagement portion, accordingly, with a simple structure, it is possible to make the first open/shut detection valve mechanism open and close together with the operation of the piston member.

According to the 1st example as to the present 1st invention, since the closed state of the first open/shut detection valve mechanism is detected via the fluid pressure supplied to the first fluid passage, accordingly it is possible to detect the valve closed state with a simple structure.

According to the 2nd example, since the first engagement portion is formed as an annulus around the external circumferential portion of the auxiliary rod, accordingly it is possible to ensure the functioning of the first engagement portion, even if the piston member rotates around its axis.

Since, according to the present 2nd invention, there is provided the twist-type clamp device in which, to the auxiliary rod and the cylinder main body of the fluid pressure cylinder of the present let invention, there is installed the twisting mechanism that rotates the output rod around its axis through the set angle and that operates together with the forward and backward operation of the output rod, accordingly it is possible to detect the movement limit position of the piston member of the twist-type clamp device via the fluid pressure. Apart from the above, the same beneficial effects are obtained as in the case of the present 1st invention.

According to the 1st example as to the present 2nd invention, the output rod extends from the piston portion upward to the exterior of the cylinder main body, and the movement limit position of the piston member is the unclamp position in which the piston portion is positioned at its upper limit position, so that it is possible to detect the unclamp position via the fluid pressure.

Since, according to the 2nd example, the second open/shut detection valve mechanism that is similar to the first open/shut detection valve mechanism and the second fluid passage that is opened and closed by the second open/shut valve mechanism are provided, and the structure is such that, when the piston member is in its unclamp position, the second spherical body does not engage with the second engagement portion, and engages with the second concave engagement portion and maintains the valve-open position, while, when the piston member has been changed over to its clamp position in which it has been lowered below its unclamp position, the second spherical body engages with the second engagement portion and the second valve body is changed over to its valve-closed position, accordingly it is possible to detect the fact that the piston member is in its clamp position via the fluid pressure in the second fluid passage.

Moreover, since the compression spring is provided that biases the second valve body toward the valve closed position, accordingly it is possible to enhance the valve closing performance of the second open/shut detection valve mechanism.

According to the 3rd example, since the second engagement portion of the second open/shut detection valve mechanism consists of a single vertical groove formed in the external circumferential portion of the auxiliary rod, accordingly it is possible to apply this structure, even if the clamp position is quite wide in the vertical direction in order to clamp various workpieces of various thicknesses.

According to the 4th example, since the second engagement portion consists of two vertical grooves formed in a vertical line in the external circumferential portion of the auxiliary rod, accordingly it is possible to apply this structure, even in the case of two positions at which the clamp position is quite wide in the vertical direction.

Since, according to the 5th example, the installation hole into which the lower portion of the clamp main body is inserted from above and installed is formed in the base member to which the twist-type clamp device is fitted, this installation hole consists of the lower installation hole portion and the upper installation hole portion that is of slightly larger diameter than the lower installation hole portion, and the lower end side portion of the clamp main body and the seal member that is installed on the external circumferential portion of the lower end side portion of the clamp main body is installed in the lower installation hole portion, and the first fluid passage communicates to the upper installation hole portion, accordingly, even supposing that some burring remains at the outer end of the first fluid passage where it opens into the upper installation hole portion, still, when the lower end portion of the clamp main body is inserted into the lower installation hole portion, the seal member on the external circumferential portion of the lower end portion of the clamp main body will not be damaged by this burring.

And since, according to the 6th example, the compression spring is provided that biases the first valve body toward the valve open side, accordingly it is possible to enhance the valve opening performance of the first open/shut detection valve mechanism.

DETAILED DESCRIPTION OF THE PREFERRED EMBODIMENTS

Figure 1:
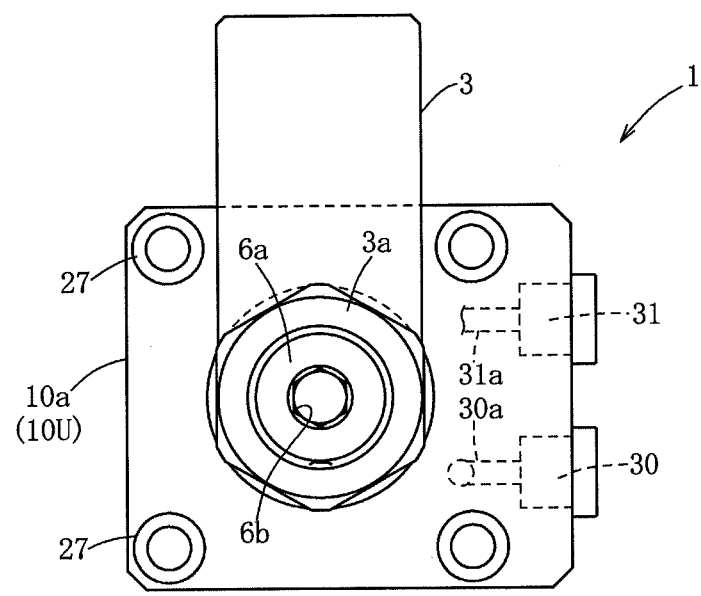
FIG. 1 is a plan view of a twist-type clamp device (unclamping state) of a first specific embodiment.

In the following, the present invention will be explained on the basis of specific embodiments thereof.

Embodiment 1

A twist-type clamp device 1 according to this first specific embodiment will now be explained on the basis of FIG. 1 through FIG. 8. This twist-type clamp device 1 comprises a hydraulic pressure cylinder 2 (a fluid pressure cylinder), a clamp arm 3 that is fixed to an upper end portion of an output rod 6 of the hydraulic pressure cylinder 2, and a twisting mechanism 8 that allows the output rod 6 to twist through a set angle (in this embodiment, 90°) around its axis. The base end portion of the clamp arm 3 is fitted on a tapered axis portion 6a of the output rod 6 and is fixed thereto by a nut 3a that is screwingly engaged to the upper end portion of the output rod 6.

This twist-type clamp device 1 goes into the unclamped state when the output rod 6 is extended from the retracted state. And the clamp device goes into the clamped state in the state in which the output rod 6 is retracted and an object to be clamped is pressed downward and clamped by the clamp arm 3. When the clamp device shifts to the clamped state shown in FIG. 4 from the unclamped state shown in FIG. 1, the output rod 6 twists by 90° in the anticlockwise rotational direction around its axis as seen in plan view. And, conversely to the above, when the clamp device shifts from the clamped state to the unclamped state, it twists by 90° in the clockwise rotational direction.

First, the hydraulic pressure cylinder 2 will be explained.

As shown in FIG. 1 through FIG. 4, this hydraulic pressure cylinder 2 comprises a cylinder main body 10, a piston member 4, an unclamp hydraulic pressure operating chamber 12a, a clamp hydraulic pressure operating chamber 12b, an auxiliary rod 7, and an open/shut detection valve mechanism 11. The cylinder main body 10 has an upper main cylinder body portion 10U and a lower main cylinder body portion 10L (this is the head end side wall member). The upper main cylinder body portion 10U has a rectangular main cylinder body portion 10a that is rectangular in plan view, and a barrel shaped cylinder main body portion 10b that extends downward from the lower end of the rectangular main cylinder body portion 10a. A mounting surface 14 is formed at the lower end of the rectangular main cylinder body portion 10b for mounting the cylinder main body to the upper surface of a base member 13. The upper main cylinder body portion 10U is fixed to the base member 13 by four bolts 27.

A cylindrical hole 15 is formed in the interior of the rectangular main cylinder body portion 10a and the barrel shaped main cylinder body portion 10b, and the lower end of the cylindrical hole 15 is closed off by the lower main cylinder body portion 10L.

The upper half portion of the lower main cylinder body portion 10L is fitted into a fitting hole 15a that is connected to the lower end of the cylindrical hole 15, and is sealed by a seal member 16. An annular clearance 17 is defined between the lower end portion of the lower main cylinder body portion 10L and the lower end portion of the barrel shaped cylinder main body portion 10b, and a ring member 19 is installed in the annular clearance 17 by screwing into a female threaded aperture 18 of the barrel shaped cylinder main body portion 10b, so that the lower main cylinder body portion 10L is fixed in the upper main cylinder body portion 10U by the ring member 19. A rod insertion hole 20 that communicates with the cylindrical hole 15 and into which an auxiliary rod 7 is inserted is formed in the lower main cylinder body portion 10L.

An installation hole 21, into which the barrel shaped cylinder main body portion 10b and the lower main cylinder body portion 10L (the lower portion of the clamp main body) are inserted from above and into which they are installed, is formed in the base member 13 to which the twist-type clamp device 1 is attached, with this installation hole 21 consisting of a lower installation hole portion 22 and an upper installation hole portion 23 that is of slightly larger diameter than the lower installation hole portion 22, and with approximately the lower two fifths of the barrel shaped cylinder main body portion 10b (the lower end portion of the clamp main body) and a seal member 24a that is fitted on the external circumferential portion thereof being installed in the lower installation hole portion 22. An annular clearance 25 is defined in the upper installation hole portion 23, around the external circumference of the barrel shaped cylinder main body portion 10b. Incidentally, a seal member 24b is installed at the upper end portion of the barrel shaped cylinder main body portion 10b.

Next, the piston member 4 will be explained.

Figure 2:
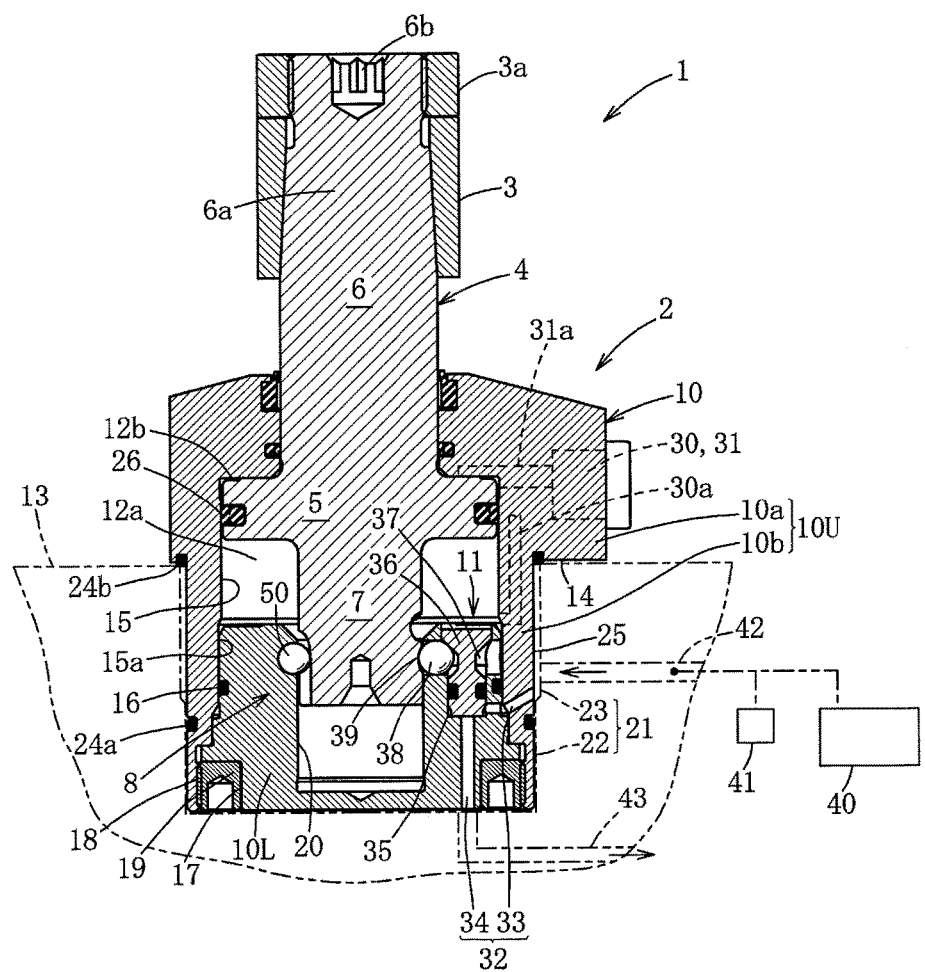
FIG. 2 is a vertical sectional view of a clamp device of FIG. 1.
Figure 4:
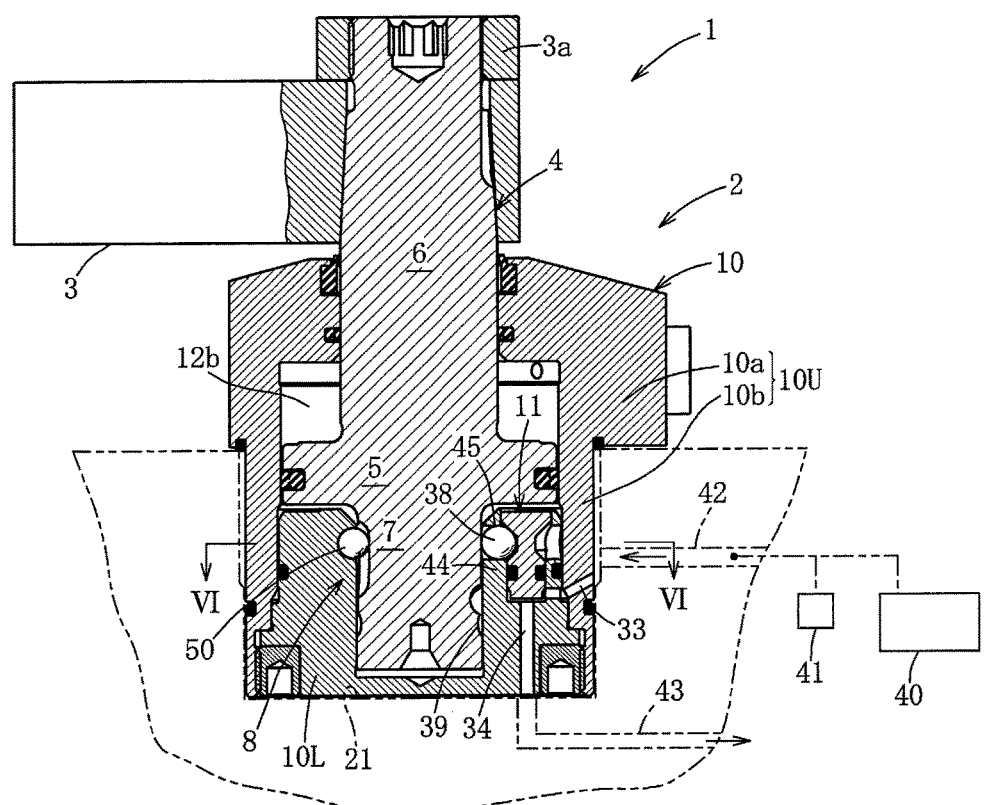
FIG. 4 is a vertical sectional view of the clamp device of FIG. 3.
Figure 5:
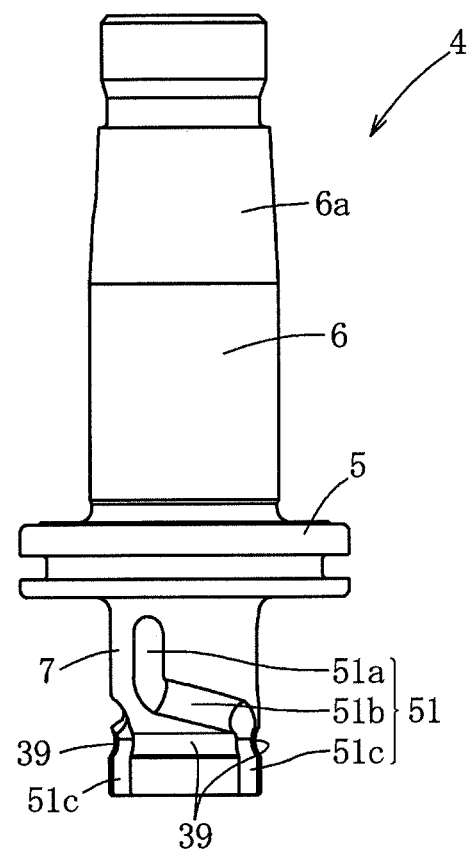
FIG. 5 is an elevation view of a piston member.
Figure 6:
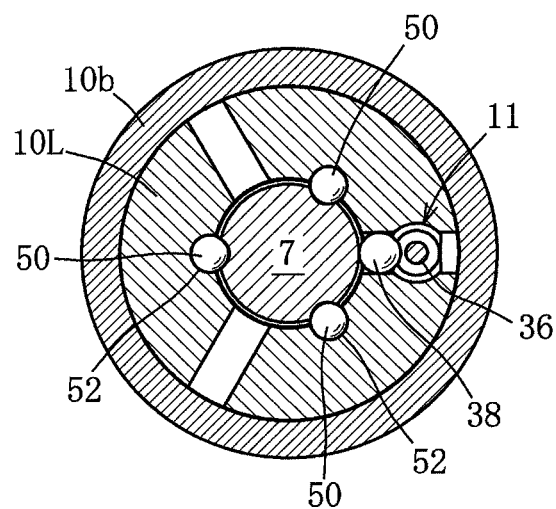
FIG. 6 is a sectional view taken along lines VI-VI of FIG. 4.

As shown in FIG. 2, FIG. 4, and FIG. 5, the piston member 4 comprises a piston portion 5 that is installed into the cylindrical hole 15 so as to slide freely therein in the vertical direction, an output rod 6 that extends upward from the piston portion 5 to the outside of the cylinder main body 10, and an auxiliary rod 7 that extends in the interior of the cylinder main body 10 downward from the piston portion 5 for a set length in the direction opposite to the output rod 6. A seal member 26 is installed on the external circumferential portion of the piston portion 5. And a hexagonal hole 6b for insertion of a wrench is formed at the upper end of the output rod 6.

The cylindrical hole 15 is divided by the piston portion 5 into upper and lower portions, with the clamp hydraulic pressure operating chamber 12b being defined above the piston portion 5 while the unclamp hydraulic pressure operating chamber 12a is defined below the piston portion 5. The hydraulic pressure operating chambers 12a, 12b are equivalent to fluid pressure operating chambers.

Hydraulic pressure ports 30, 31 are formed in the rectangular main cylinder body portion 10a of the upper main cylinder body portion 10U, and the hydraulic pressure port 30 is communicated with the unclamp hydraulic pressure operating chamber 12a by a hydraulic passage 30a in the cylinder main body 10, while the hydraulic pressure port 31 is communicated with the clamp hydraulic pressure operating chamber 12a by a hydraulic passage 31a in the cylinder main body 10, with the hydraulic pressure ports 30, 31 being connected to a hydraulic pressure supply source (not shown in the figures) by hydraulic hoses or the like.

Next, the open/shut detection valve mechanism 11 and an air passage 32 (a fluid passage) will be explained. This open/shut detection valve mechanism 11 is installed in the lower main cylinder body portion 10L of the cylinder main body 10, and an intermediate portion of an air passage 32 that is formed in the cylinder main body 10 is opened and closed by the open/shut detection valve mechanism 11. The air passage 32 comprises an upstream side air passage 33 that communicates the annular clearance 25 with the lower outer circumferential end portion of the valve body reception hole 35, and a downstream side air passage 34 that communicates the lower central end portion of the valve body reception hole 35 with the bottom portion of the installation hole 21. Pressurized air is supplied to the upstream side air passage 33 from a pressurized air supply source 40 via an air passage 42 in the base member 13 and the annular clearance 25, and, when the open/shut detection valve mechanism 11 is in the open state, the pressurized air described above flows to the downstream side air passage 34, and is then vented to the atmosphere via an air passage 43 in the base member 13.

The open/shut detection valve mechanism 11 (i.e. the first open/shut detection valve mechanism) comprises a valve body reception hole 35 (i.e. a first valve body reception hole), a valve body 36 (i.e. a first valve body) that is movably received in the valve body reception hole 35, an annular concave engagement portion 37 (i.e. a first concave engagement portion) that is formed on the external circumferential portion of the valve body 36, a spherical body 38 (i.e. a first spherical body) capable of engaging with the concave engagement portion 37, and an engagement portion 39 (i.e. a first engagement portion) that is formed on the auxiliary rod 7 and with which the spherical body 38 is capable of engaging.

The valve body reception hole 35 is formed to be almost cylindrical and parallel with the axis of the cylindrical hole 15 in the lower main cylinder body portion 10L, and the valve body reception hole 35 is communicated to the unclamp hydraulic pressure operating chamber 12a. The inner diameter of approximately a quarter to a fifth of the valve body reception hole 35 at its upper end is formed to be slightly larger than the inner diameter of the remaining portion thereof, and the inner diameter of the hole reduces smoothly from the large diameter portion.

As shown in FIG. 2, FIG. 4, FIG. 7, and FIG. 8, the valve body 36 is received in the valve body reception hole 35 so as to be movable in the vertical direction, and is disposed so as to be capable of being subjected to the hydraulic pressure in the unclamp hydraulic pressure operating chamber 12a; and the length in the vertical direction of the valve body 36 is almost equal to the length in the vertical direction of the valve body reception hole 35. The concave engagement portion 37 is formed on the external circumferential portion of the upper portion of the valve body 36. This concave engagement portion 37 comprises a small diameter cylindrical surface 37a at a central height portion thereof, an upper side conical surface portion 37b that continues upward from the upper edge of the cylindrical surface 37a and that increases in diameter upward, and a lower side conical surface portion 37c that continues downward from the lower edge of the cylindrical surface 37a and that increases in diameter downward. Incidentally, a seal member 36a is installed on the external circumferential portion of the lower portion of the valve body 36.

A spherical body retention hole 45 is formed in a wall portion 44 of the lower main cylinder body portion 10L between the rod insertion hole 20 and the valve body reception hole 35. This spherical body retention hole 45 is a cylindrical hole of small diameter that is oriented in the horizontal direction. The spherical body 38 is installed in the spherical body retention hole 45 so as to be movable in the horizontal direction, and is held so as to be capable of engaging with the concave engagement portion 37. It should be understood that the diameter of the spherical body 38 is set to be greater than the thickness of the wall portion 44.

As shown in FIG. 2, the engagement portion 39 is formed on the external circumferential portion of the auxiliary rod 7, and consists of an annular groove in which a portion of the spherical body 38 engages when the piston member 4 is in the unclamp position.

During the unclamped state, since hydraulic pressure in the unclamp hydraulic pressure operating chamber 12a acts on the upper end of the valve body 36 and a portion of the spherical body 38 engages with the engagement portion 39 and the spherical body 38 is shifted toward the auxiliary rod 7, accordingly shifting downward of the upper side conical surface portion 37b of the concave engagement portion 37 is permitted and the valve body 36 descends, so that the lower end surface of the valve body 36 contacts against the bottom surface of the valve body reception hole 35, and the open/shut detection valve mechanism 11 goes into the closed state. This closed state is detected by the pressure switch 41 or by a pressure sensor connected to the pressurized air supply system.

As shown in FIG. 4, when the piston member 4 shifts downward from the unclamp position, the engagement portion 39 shifts more downward than the spherical body 38, and, since the spherical body 38 is pushed toward the valve body 36 by the outer peripheral surface of the auxiliary rod 7, accordingly the spherical body 38 pushes the upper side conical surface portion 37b of the concave engagement portion 37 upward. Due to this, the valve body 36 shifts slightly upward, and a gap is created between the lower end surface of the valve body 36 and the bottom surface of the valve body reception hole 35, so that the open/shut detection valve mechanism 11 is held in the open state.

Next the twisting mechanism 8 will be explained that is installed to the auxiliary rod 7 and the cylinder main body 10 of the hydraulic pressure cylinder 2, and that operates to rotate the output rod 6 through a set angle about its axis together with the forwards and backwards operation of the output rod 6.

As shown in FIG. 2, FIG. 4, FIG. 5, and FIG. 6, the twisting mechanism 8 comprises three steel balls 50 and three engagement grooves 51 into each of which one of steel balls 50 is engaged. And three half-spherical concave engagement portions 52 are formed on the external circumferential wall portion of the rod insertion hole 20 of the lower main cylinder body portion 10L, so as to divide that wall portion into three equal portions around its circumferential direction.

The three engagement grooves 51 described above into which the three steel balls 50 are respectively engaged are formed at positions on the external circumferential portion of the auxiliary rod 7 that divide the circumferential direction into three equal parts, and half of one of the steel balls 50 is engaged into each of the engagement grooves 51. Approximately the upper one third portion of each of the engagement grooves 51 is formed as a straight groove 51a extending in a vertical orientation; approximately the lower one third portion of that groove 51 is formed as a straight groove 51c that is 90° different from the groove portion 51a in rotational position in the anticlockwise rotational direction as seen in plan view; and its central height portion is formed as a helical groove 51b extending over 90° as seen in plan view, so as to connect the lower end of the upper portion straight groove 51a to the upper end of the lower portion straight groove 51c. Each of the steel balls 50 is engaged into a corresponding concave engagement portion 52 and into a corresponding engagement groove 51.

Accordingly, when the piston member 4 is lowered from its unclamp position which is its upper limit position to its clamp position, due to the operation of the twisting mechanism 8 described above, the piston member 4 (i.e., the output rod 6) twists around its axis in the anticlockwise rotational direction through approximately 90° as seen in plan view. And, conversely to the above, when the piston member 4 is raised from its clamp position which is its lower limit position to its unclamp position, the piston member 4 (i.e., the output rod 6) twists through approximately 90° in the clockwise rotational direction.

Next, the operation of the twist-type clamp device 1 and the beneficial effects will be explained.

Figure 8:
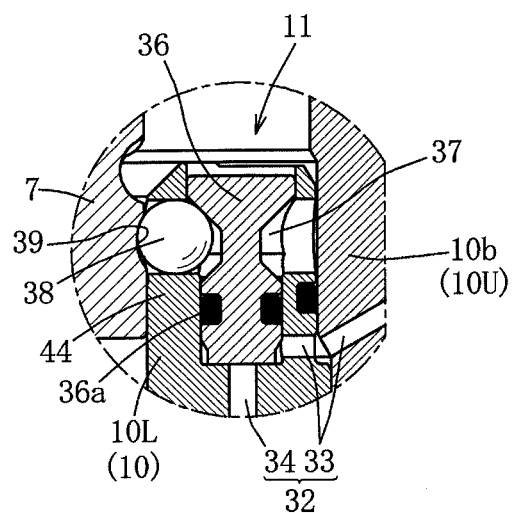
FIG. 8 is an enlarged vertical sectional view of the open/shut detection valve mechanism (closed state) and its surrounding portions.

In the unclamped state shown in FIG. 1 and FIG. 2, hydraulic pressure is charged into the unclamp hydraulic pressure operating chamber 12a, and, in the open/shut detection valve mechanism 11, the hydraulic pressure in the unclamp hydraulic pressure operating chamber 12a acts on the upper end of the valve body 36, and a portion of the spherical body 38 engages to the engagement portion 39 of the auxiliary rod 7 and the spherical body 38 does not press against the upper side conical surface portion 37b of the concave engagement portion 37 of the valve body 36, so that, as shown in FIG. 2 and FIG. 8, the valve body 36 is lowered down to its lower limit position and the valve is in the closed position. Due to this, the air passage 32 is intercepted, and, since the air pressure in the air passage 42 is elevated and the pressure switch 41 is turned ON, accordingly it is possible for a control unit that receives the detection signal of the pressure switch 41 to detect that the clamp device 1 is in the unclamped state.

Figure 3:
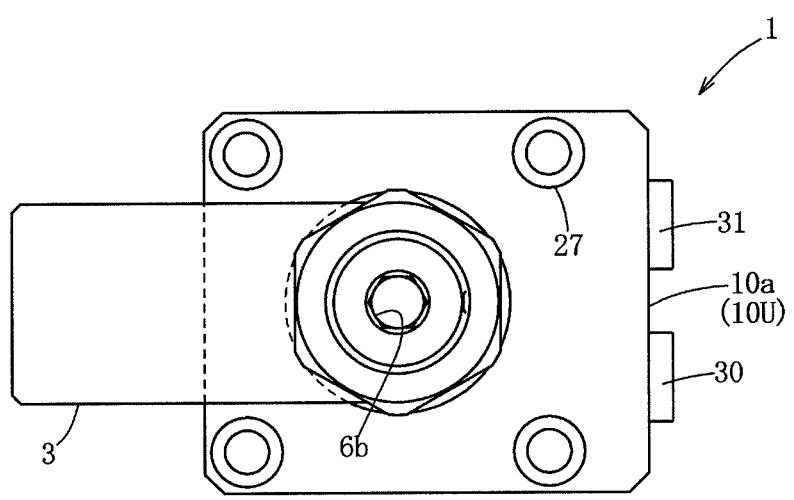
FIG. 3 is a plan view of the twist-type clamp device (clamping state)

When, in order to clamp the object to be clamped, the hydraulic pressure in the unclamp hydraulic pressure operating chamber 12a is changed over to drain pressure and hydraulic pressure is supplied to the clamp hydraulic pressure operating chamber 12b, the piston member 4 is lowered to the clamp position, and, as shown in FIG. 3, the output rod 6 clamps the object to be clamped in the state in which the output rod 6 has been rotated through approximately 90° in the anticlockwise rotational direction. It should be understood that the clamp position described above is not limited to being a position at a constant height; rather, it is a position corresponding to the thickness of the workpiece to be clamped.

Figure 7:
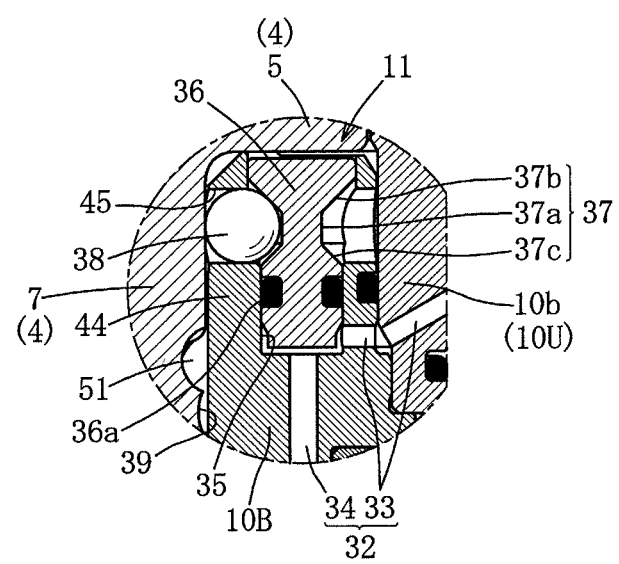
FIG. 7 is an enlarged vertical sectional view of an open/shut detection valve mechanism (open state) and its surrounding portions.

When the piston member 4 lowers, the engagement portion 39 of the auxiliary rod 7 also lowers, so that the spherical body 38 presses against the valve body 36 via the outer peripheral surface of the auxiliary rod 7, and, since the spherical body 38 engages with the concave engagement portion 37 of the valve body 36 and presses its upper side conical surface portion 37b upward, accordingly the valve body 36 shifts slightly upward, and, as shown in FIG. 4 and FIG. 7, the first valve body 36 of the open/shut detection valve mechanism 11 goes into the open position. Since, due to this, the pressure switch 41 returns to OFF, accordingly it is possible to detect that the system is no longer in the unclamped state.

When the piston member 4 has shifted to its unclamp position (i.e. its movement limit position) in this manner, the open/shut detection valve mechanism 11 changes over to its closed position so that the air passage 32 is intercepted, and accordingly the fact that the piston member 4 has shifted to its unclamp position can be detected via the open/shut detection valve mechanism 11 and the air pressure that is supplied to the air passage 32. And, since the hydraulic pressure in the unclamp hydraulic pressure operating chamber 12a biases the valve body 36 to the closed position, accordingly the operational reliability of the open/shut detection valve mechanism 11 is excellent.

Since the open/shut detection valve mechanism 11 is installed in the wall portion of the cylinder main body 10, accordingly it is possible to make the hydraulic pressure cylinder 2 more compact. And, since the valve body 36 of the open/shut detection valve mechanism 11 has the concave engagement portion 37 on its external circumferential portion and is adapted to be opened by the spherical body 38 not engaging to the engagement portion 39 but being engaged to the concave engagement portion 37, while being closed by the spherical body 38 being engaged to the engagement portion 39, accordingly it is possible to make the open/shut detection valve mechanism 11 open and close together with the operation of the piston member 4, with a simple structure.

Moreover, since the closed state of the open/shut detection valve mechanism 11 is detected via the pressure of the pressurized air that is supplied to the air passage 32, accordingly it is possible to detect the closed state of the valve with a simple structure.

And, since the engagement portion 39 is formed as an annulus around the external circumferential portion of the auxiliary rod 7, accordingly it is possible to assure the functioning of the engagement portion 39, even though the piston member 4 rotates around its axis.

Furthermore since, in this twisting clamp device 1, the auxiliary rod 7 and the cylinder main body 10 of the fluid pressure cylinder 2 are provided with the twisting mechanism 8 which causes the output rod 6 to rotate through the set angle around its axis together with the operation of the forward and backward operation of the output rod 6, accordingly it is possible to detect the movement limit position of the piston member 4 of the twisting clamp device 1 via the pressure of the pressurized air.

Since the installation hole 21 in the base member 13 to which the twisting clamp device 1 is attached by inserting the lower portion of the clamp main body 10 thereinto from above and installing it therein consists of the lower installation hole portion 22 and the upper installation hole portion 23 whose diameter is slightly larger than that of the lower installation hole portion 22, and since the lower end portion of the clamp main body 10 and the seal member 24a that is installed on the external circumferential portion thereof are installed in the lower installation hole portion 22, accordingly, although the air passage 42 that communicates with the upper installation hole portion 23 is provided, even if some burring remains at the end of the air passage 42 where it opens into the upper installation hole portion 23, still, when the lower end portion of the clamp main body 10 is inserted into and installed in the lower installation hole portion 22, the seal member 24a on the external circumferential portion of the lower end portion of the clamp main body 10 is not damaged by the aforementioned burring.

Variant embodiments in which the twist-type clamp device 1 of the above embodiment 1 is partially altered will now be explained.

Figure 9:
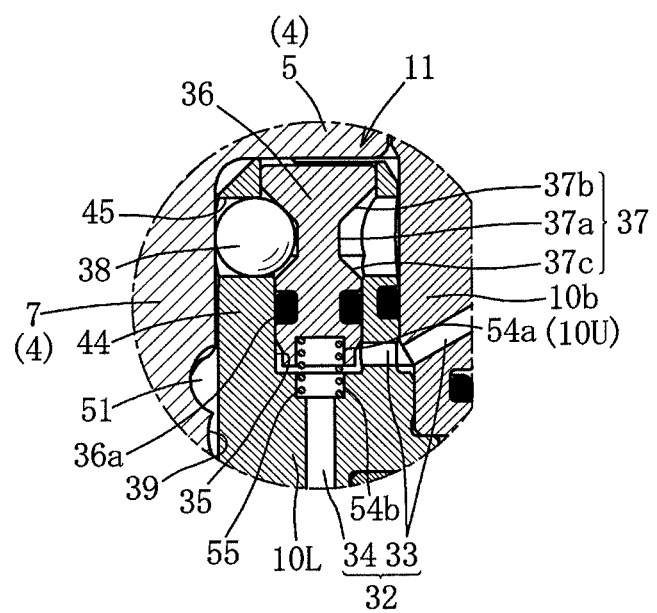
FIG. 9 is an enlarged vertical sectional view of a variant example of the open/shut detection valve mechanism (open state) and its surrounding portions.

(1) As shown in FIG. 9, in the open/shut detection valve mechanism 11, it would also be acceptable to form a hole 54a whose lower end is open to the lower end portion of the valve body 36 as well as forming a hole 54b whose upper end is open to the lower main cylinder body portion 10L at a location at the upper end portion of the air passage 34, and to install a compression spring 55 that biases the valve body 36 upward to its open side in the hole 54a whose lower end is open and in this hole 54b whose upper end is open. If this compression spring 55 is provided, then the operational reliability for opening of the valve is enhanced.

Figure 10:
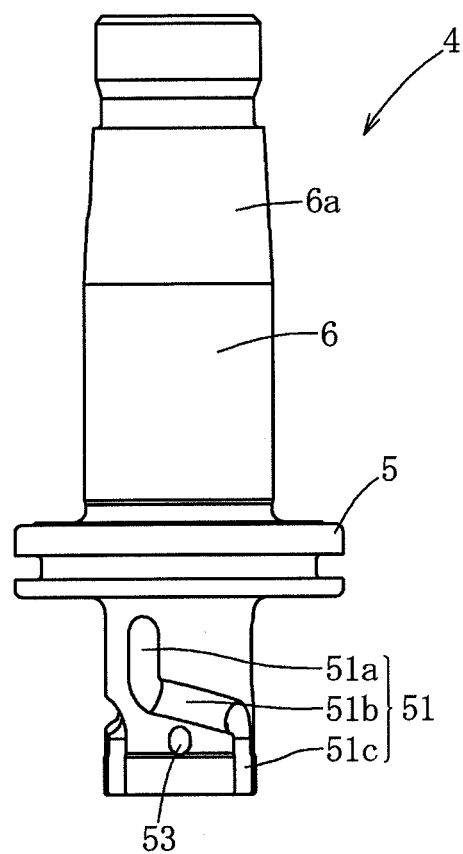
FIG. 10 is an elevation view of a variant example of the piston member.

(2) As shown in FIG. 10, instead of the abovementioned annular engagement portion 39, it would also be acceptable to provide a structure in which an engagement portion 53 consisting of a spherical concave portion is formed on the auxiliary rod 7, so that the spherical body is engaged into the engagement portion 53 when the piston member 4 is in the unclamp position.

Figure 11:
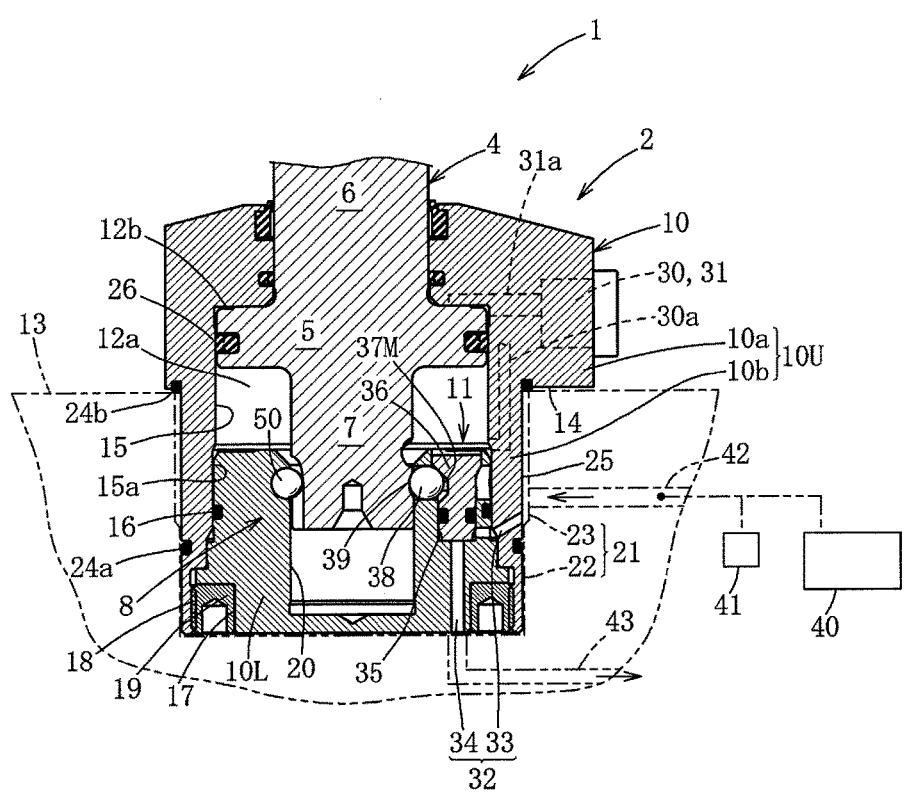
FIG. 11 is a vertical sectional view of a principal portion of a variant example of a clamp device.
Figure 12:
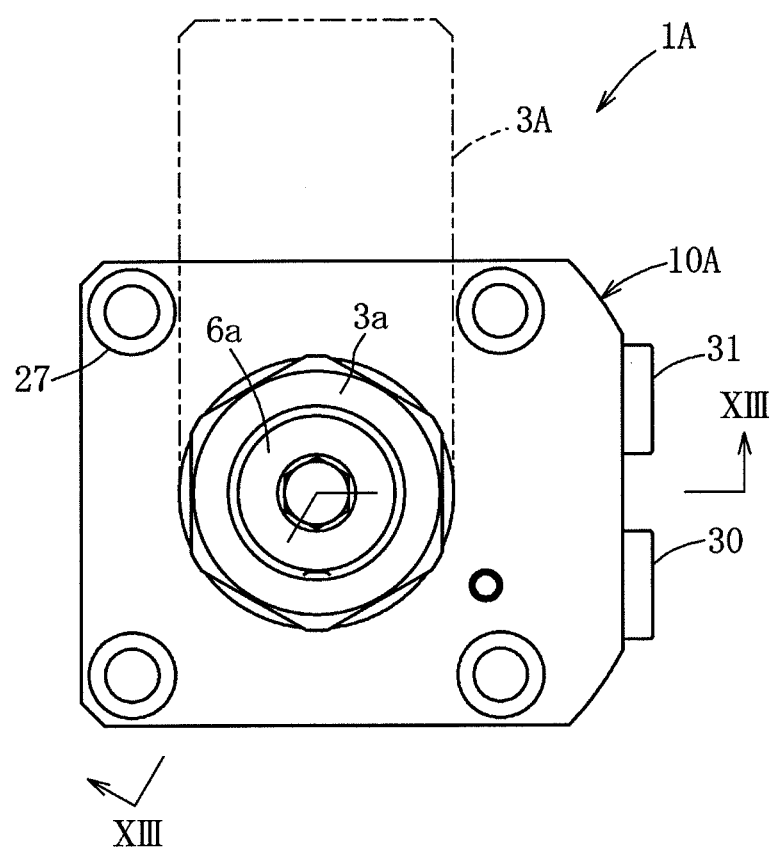
FIG. 12 is a plan view of a twist-type clamp device (unclamping state) of a second specific embodiment.

(3) As shown in FIG. 11, instead of the abovementioned annular concave engagement portion 37, it would also be acceptable to arrange to provide a concave engagement portion 37M in the valve body 36 that is formed around a portion thereof in the circumferential direction but not annular, and with which the spherical body 38 can engage.

(4) The direction of flow of the pressurized air flowing in the air passage 32 is not to be considered as being limited to the direction described in the above embodiment; it would also be acceptable to provide a structure in which the pressurized air supply source 40 is connected to the air passage 34, and air flows from the air passage 34 toward the air passage 32.

(5) Since the engagement portion 39 formed on the abovementioned auxiliary rod 7 is a structure for biasing the spherical body 38 toward the axis, it is not necessary for the engagement portion 39 to be in linear contact with the spherical body 38; any structure would be acceptable that can push the spherical body 38 toward the axis, thus returning it to the state shown in FIG. 4.

(6) If a similar engagement portion to the engagement portion 39 is formed on the portion of the auxiliary rod 7 that corresponds to the spherical body 38 in FIG. 4 as well, then, in addition to being able to detect shifting of the piston member 4 to the unclamp position, it would also become possible to detect shifting of the piston member 4 to the clamp position.

(7) The hydraulic pressure cylinder 2 of the present invention could also be applied to clamp devices of various types other than the twist-type clamp device 1.

Embodiment 2

Apart from a first open/shut detection valve mechanism 11A for detecting the unclamp position, the twist-type clamp device 1A according to this second specific embodiment is provided with a second open/shut detection valve mechanism 61 for detecting the clamp position. In the figures, the same reference symbols are appended to members that are the same as ones of the twist-type clamp device 1 of the first specific embodiment, and moreover similar reference symbols (with the letter A affixed) are appended to members that are similar; and explanation thereof will be omitted, with only the structures that are different from those of the twist-type clamp device 1 being explained.

This twist-type clamp device 1A comprises a hydraulic pressure cylinder 2A (a fluid pressure cylinder), a clamp arm 3A that is fixed to the upper end portion of an output rod 6A of the hydraulic pressure cylinder 2A, and a twisting mechanism 8 that rotates the output rod 6A through a set angle about its axis (in this embodiment, 90°). Since the twist-type clamp device 1A operates in a similar manner to the clamp device 1 described above, only a summarized explanation of its operation will be provided.

First, the hydraulic pressure cylinder 2A will be explained.

As shown in FIG. 12 through FIG. 15, the hydraulic pressure cylinder 2A comprises a cylinder main body 10A, a piston member 4A, a cylindrical hole 15A, an unclamp hydraulic pressure operating chamber 12a, a clamp hydraulic pressure operating chamber 12b, an auxiliary rod 7A, the first open/shut detection valve mechanism 11A, and the second open/shut valve detection mechanism 61. The cylinder main body 10A is similar to the cylinder main body 10 of the first embodiment. The piston member 4A comprises a piston portion 5A, an output rod 6A, and the auxiliary rod 7A that extends from the piston portion 5A on the side opposite to the output rod 6A. Apart from having the second open/shut detection valve mechanism 61, the hydraulic pressure cylinder 2A is similar to the hydraulic pressure cylinder 2 described above.

The first open/shut detection valve mechanism 11A is similar to the open/shut detection valve mechanism 11 of the first embodiment, and is a device for detecting the fact that the clamp device 1A is in the unclamped state.

Figure 13:
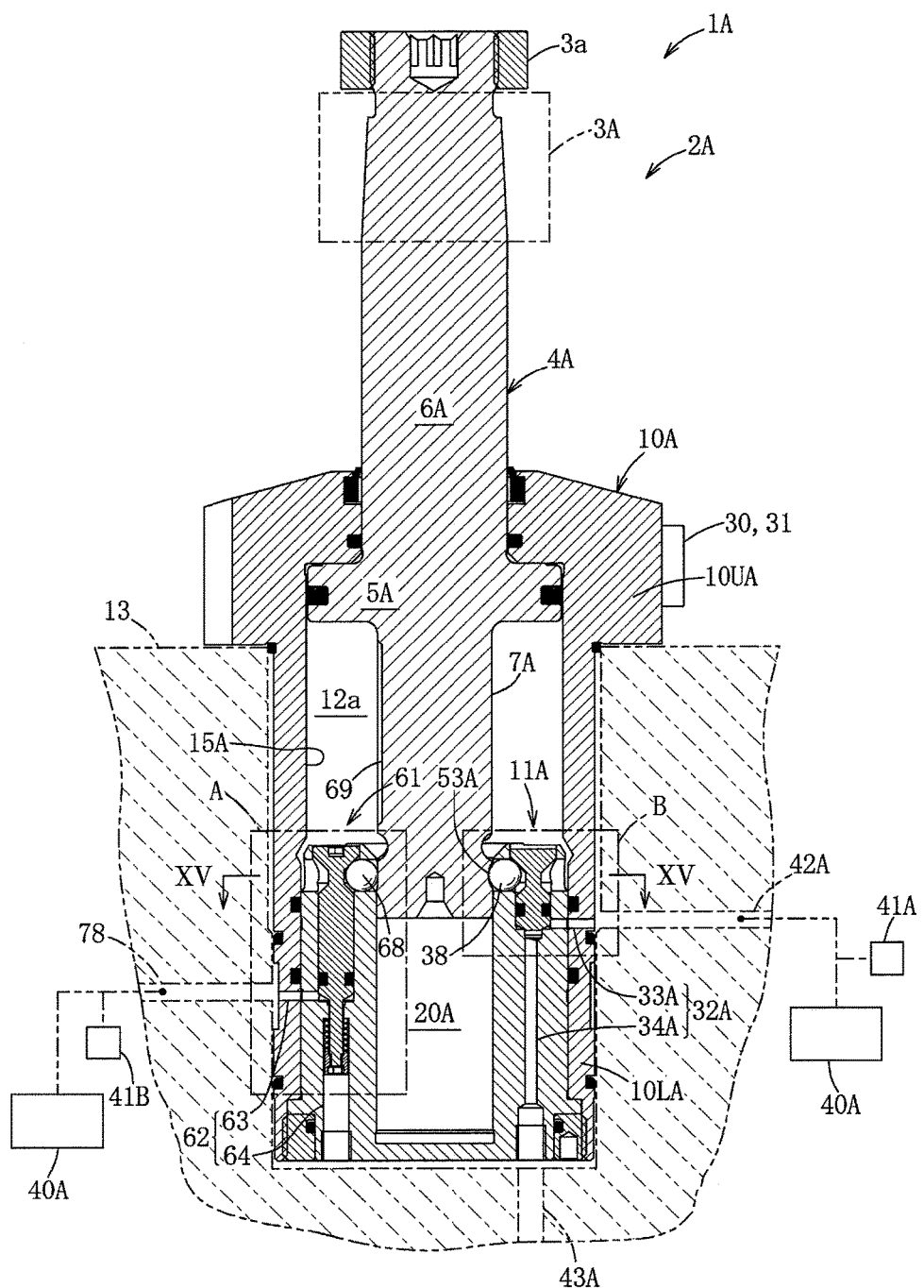
FIG. 13 is a sectional view taken along lines XIII-XIII of FIG. 12.
Figure 17:
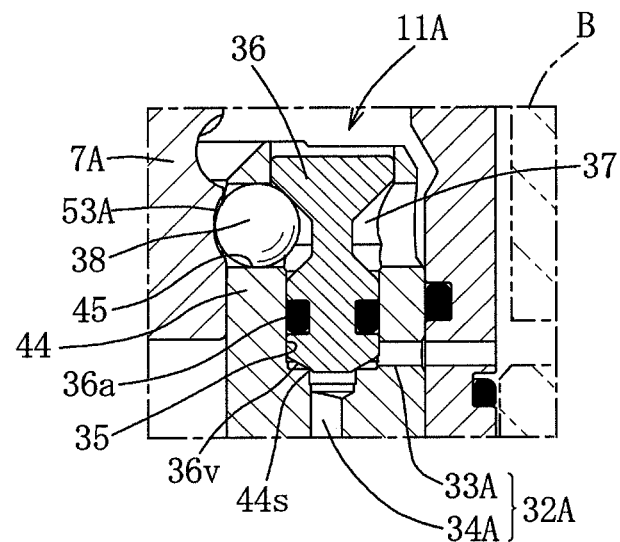
FIG. 17 is an enlarged view of a portion B of FIG. 13.
Figure 18:
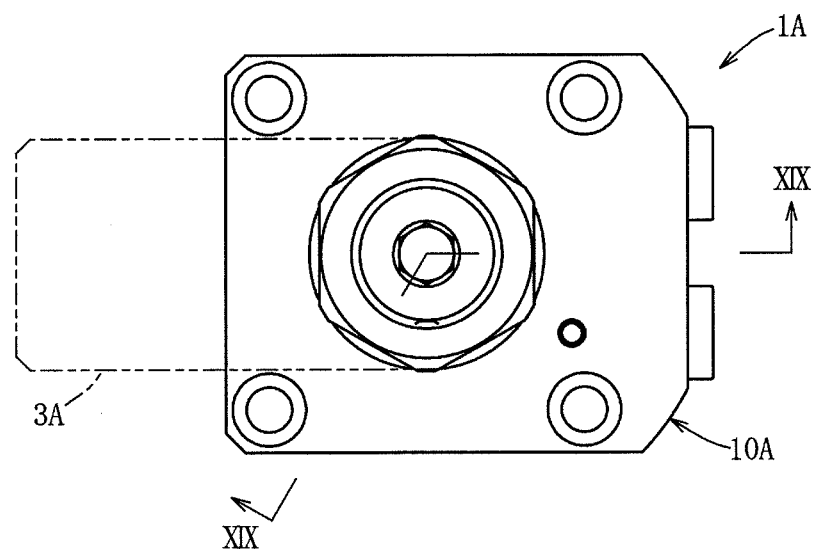
FIG. 18 is a plan view of the twist-type clamp device (clamping state) of second specific embodiment.

As shown in FIG. 13 and FIG. 17, the first open/shut detection valve mechanism 11A comprises a first valve body reception hole 35, a first valve body 36 that is movably received in the first valve body reception hole 35, an annular first concave engagement portion 37 that is formed on the external circumferential portion of the first valve body 36, a first spherical body 38 that is capable of engaging with the first concave engagement portion 37, and a first engagement portion 53A that is formed on the auxiliary rod 7A and with which the first spherical body 38 is capable of engaging.

A valve face 36v consisting of a tapered surface that becomes larger in diameter upward is formed on the lower end of the first valve body 36, and an annular valve seat 44s that opposes the valve face 36v is formed on a wall portion at the upper end of a downstream side air passage 34A; and the valve-closed state is established when the valve face 36v contacts against the valve seat 44s. It should be understood that the first engagement portion 53A is similar to the engagement portion 53 shown in FIG. 10.

Figure 19:
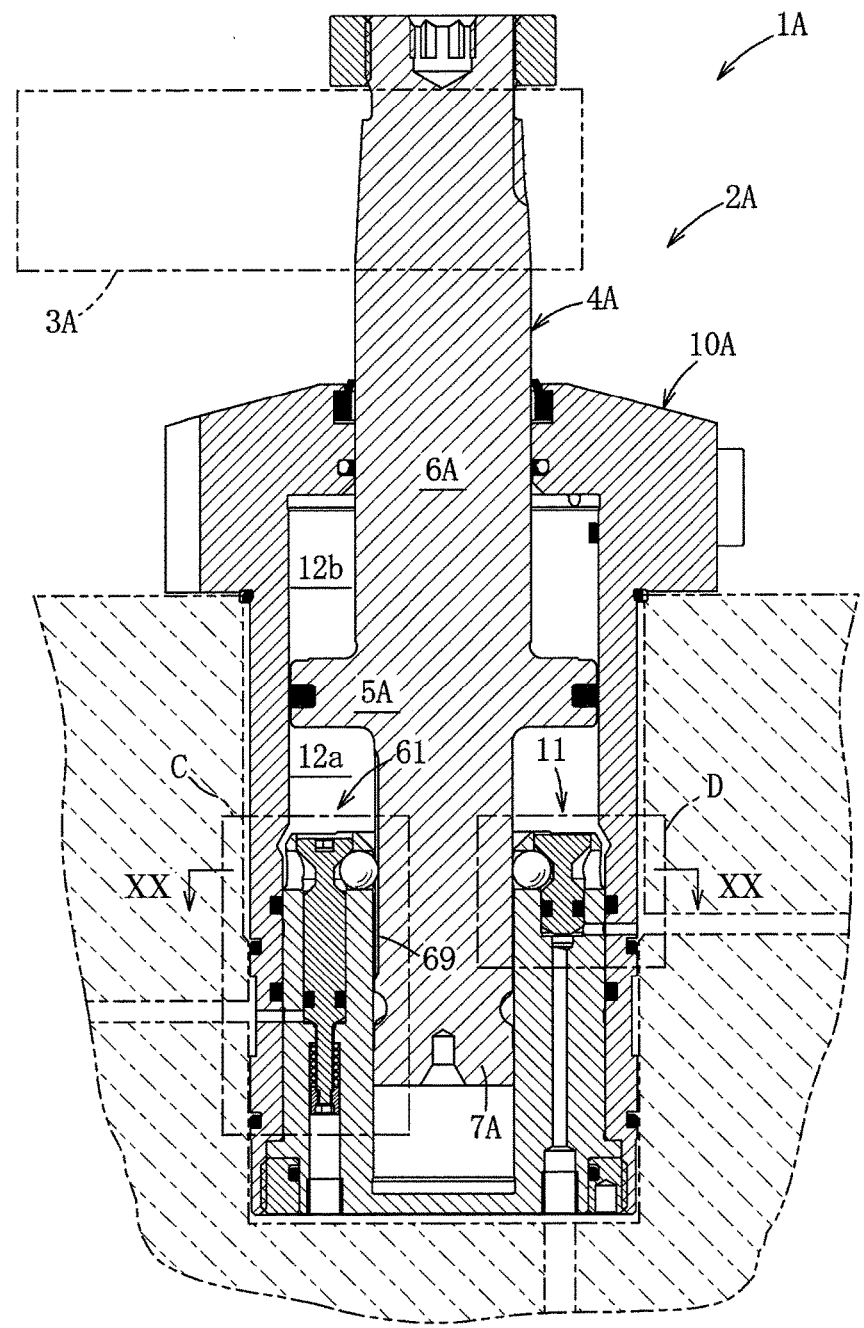
FIG. 19 is a sectional view taken along lines XIX-XIX of FIG. 18.
Figure 22:
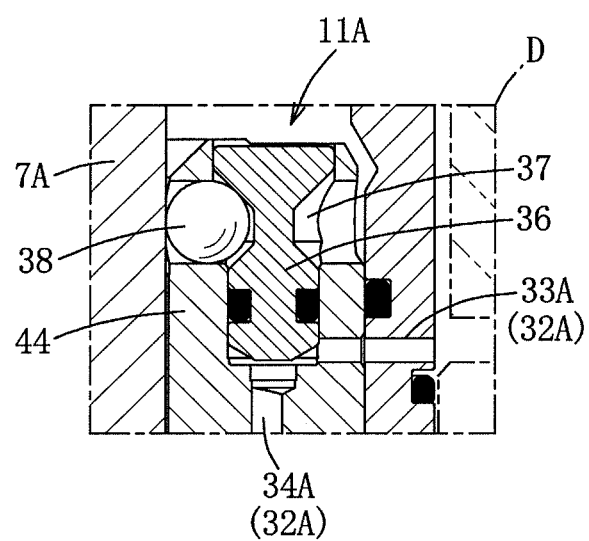
FIG. 22 is an enlarged view of a portion D of FIG. 19.

As shown in FIG. 13 and FIG. 17, when the piston member 4A is in the unclamp position (i.e. in its upper limit position), the first open/shut detection valve mechanism 11A is in its closed state, and the air passage 32A is intercepted. Moreover, as shown in FIG. 19 and FIG. 22, when the piston member 4A is in the state (i.e. the clamp position) of being slightly lowered downward from the unclamp position (i.e. from its upper limit position), the first open/shut detection valve mechanism 11A is put into its open state, and the air passage 32A is put into the communicating state.

Next, the second open/shut detection valve mechanism 61 will be explained.

Figure 16:
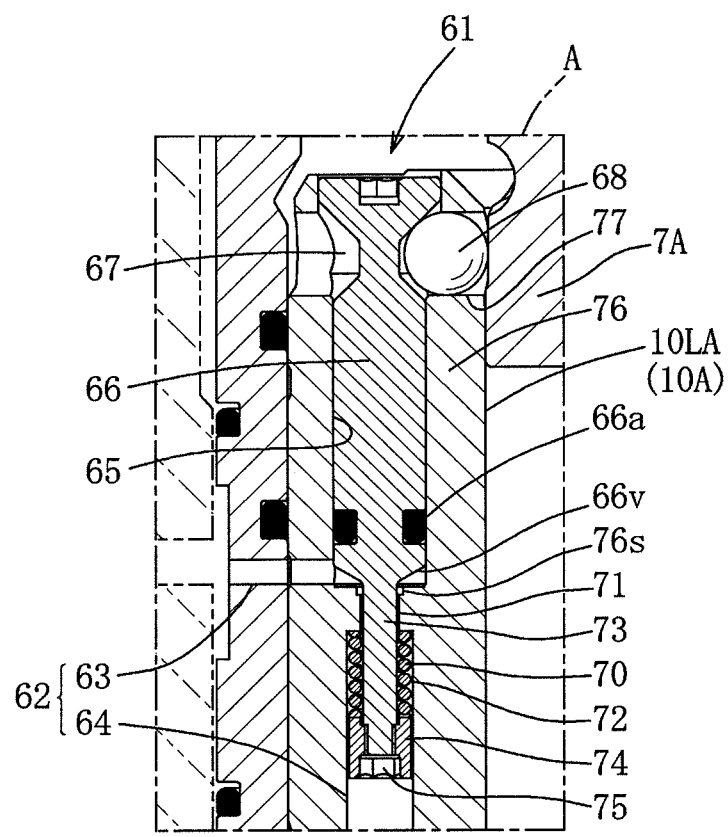
FIG. 16 is an enlarged view of a portion A of FIG. 13.
Figure 21:
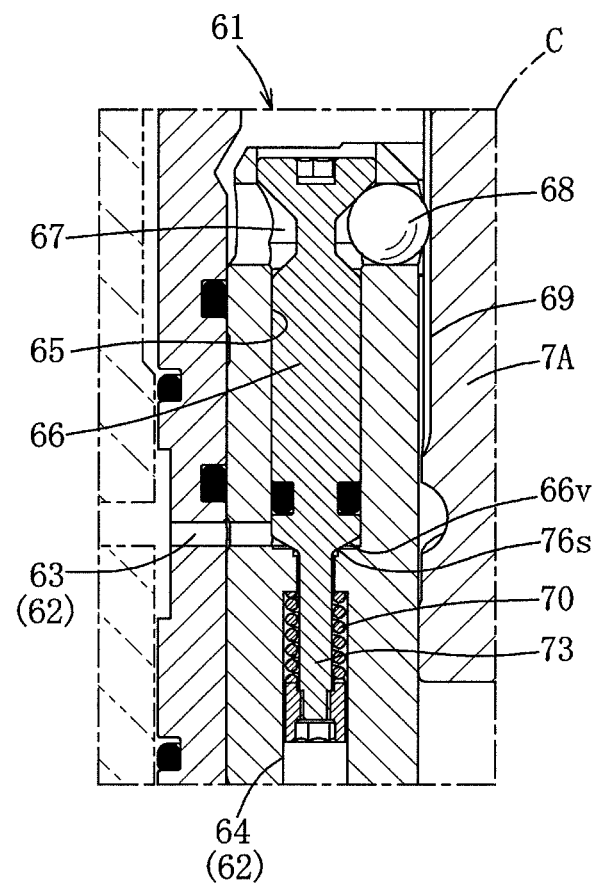
FIG. 21 is an enlarged view of a portion C of FIG. 19.

The second open/shut detection valve mechanism 61 is a device for detecting the fact that the clamp device 1A is in the clamped state. As shown in FIG. 13 and FIG. 16, when the piston member 4A is in the unclamp position, the second open/shut detection valve mechanism 61 goes into the open state and puts the air passage 62 into the communicating state. Moreover, as shown in FIG. 19 and FIG. 21, when the piston member 4A is in the state (i.e. the clamp position) of being slightly lowered downward from the unclamp position (i.e. from its upper limit position), the valve mechanism 61 goes into the closed state and the air passage 62 is intercepted. It should be understood that clamp positions are set between the clamp arm 3 and the base member 13 having widths in the vertical direction suitable for clamping workpieces (i.e. objects to be clamped) of various thicknesses.

Figure 15:
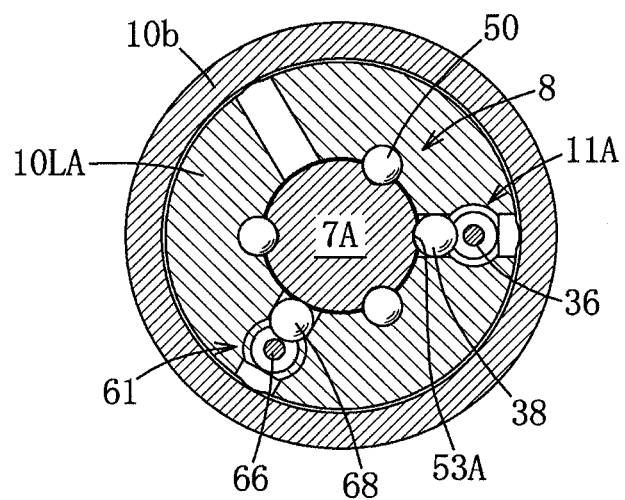
FIG. 15 is a sectional view taken along lines XV-XV of FIG. 13.

As shown in FIG. 15, the second open/shut detection valve mechanism 61 is provided to the lower main cylinder body portion 10LA at a position that differs in rotational position with respect to the first open/shut detection valve mechanism 11A by, for example, approximately 120° in plan view in the clockwise rotational direction.

Figure 20:
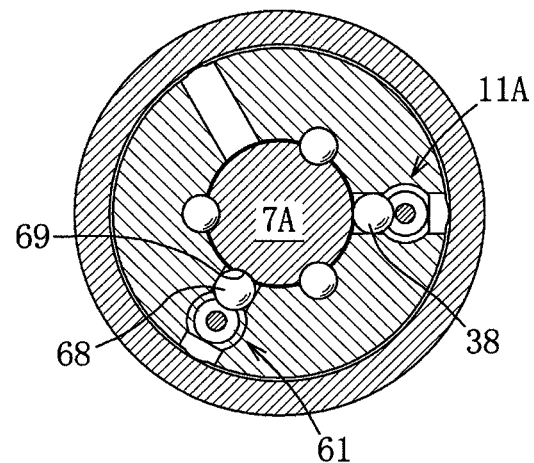
FIG. 20 is a sectional view taken along lines XX-XX of FIG. 19.

As shown in FIG. 13 and FIG. 16, the second open/shut valve mechanism 61 comprises a second valve body reception hole 65, a second valve body 66 that is movably received in the second valve body reception hole 65, an annular second concave engagement portion 67 that is formed on an external circumferential portion of the second valve body 66, a second spherical body 68 that is capable of engaging with the second concave engagement portion 67, a second engagement portion 69 that is formed on the auxiliary rod 7A and with which the second spherical body 68 is capable of engaging (refer to FIG. 14, FIG. 19, and FIG. 20), and a compression spring 70 that elastically biases the second valve body 66 in the valve closing direction. Incidentally, a seal member 66a is installed on an external circumferential portion of the second valve body 66 in the neighborhood of its lower end.

The second valve body reception hole 65 is formed in the upper half portion of the lower main cylinder body portion 10LA and extends longitudinally approximately parallel to the axis of the cylindrical hole 15A, while a rod hole 71 and a spring reception hole 72 that are communicated with the second valve body reception hole 65 are formed concentrically with the second valve body reception hole 65 in the lower half portion of the lower main cylinder body portion 10LA. The rod hole 71 and the spring reception hole 72 also serve as a downstream side air passage 64 for the air passage 62.

A second concave engagement portion 67 is formed at the upper end portion of the second valve body 66, and has a shape similar to that of the first concave engagement portion 37. A spherical body retention hole 77 is formed in the wall portion 76 between the second valve body reception hole 65 and the rod insertion hole 20A, with the second spherical body 68 being installed in the spherical body retention hole 77 so as to be movable in the radial direction, and the second spherical body 68 is partially engaged with the second concave engagement portion 67. A small diameter rod portion 73 is formed to extend downward from the lower end of the second valve body 66, and the small diameter rod portion 73 passes through the rod hole 71 and extends into the spring reception hole 72. Incidentally, the small diameter rod portion 73 is smaller in diameter than the rod hole 71.

The compression spring 70 is fitted within the spring reception hole 72 over the small diameter rod portion 73, and the upper end of the compression spring 70 is received and stopped against the upper end wall of the spring reception hole 72. A sleeve body 74 is fitted over the lower portion of the small diameter rod portion 73, and this sleeve 74 is supported by a nut 75 that is screwingly engaged on the lower end portion of the small diameter rod portion 73, with the lower end of the compression spring 70 being received and stopped by the sleeve 74.

As shown in FIG. 13 and FIG. 16, a valve surface 66v, consisting of a part conical surface whose diameter increases upwards, is formed on the lower end portion of the second valve body 66. And a valve seat 76s that opposes the valve face 66v is formed on the wall portion at the upper end of the rod hole 71. The valve closed state is established when the valve face 66v contacts against the valve seat 76s. The air passage 62 that is opened and closed by the second open/shut detection valve mechanism 61 comprises an upstream side air passage 63 that is formed in the cylinder main body 10A so as to communicate with the external circumference of the lower end portion of the second valve body reception hole 65, and a downstream side air passage 64 that includes the rod hole 71 and the spring reception hole 72.

The upstream side air passage 63 is connected to a pressurized air supply source 40A via an air passage 78 in the base member 13, and a pressure switch 41 or a pressure sensor is connected to the air passage 78. And the downstream side air passage 64 is vented to atmosphere via an air passage 43A in the base member 13.

Figure 14:
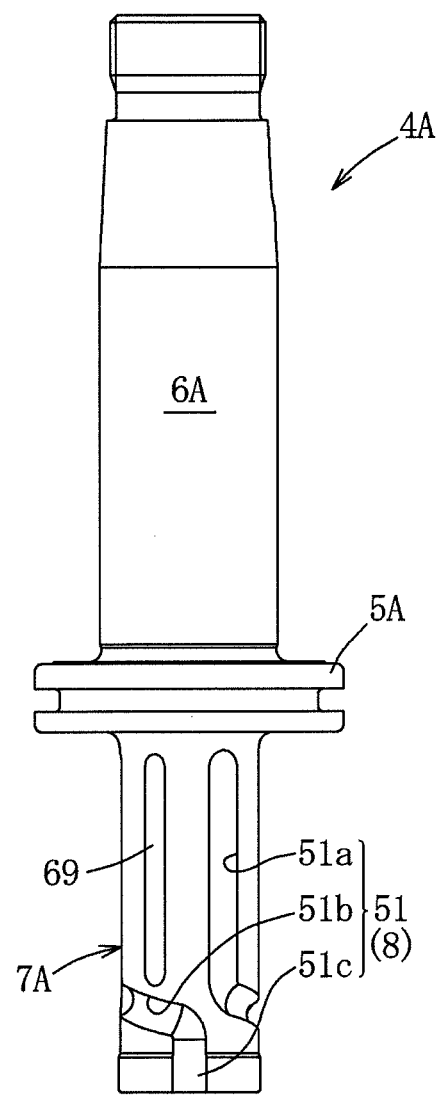
FIG. 14 is an elevation view of a piston member of FIG. 13.

As shown in FIG. 14, a single second engagement portion 69 that is formed as a vertical groove is formed in the external circumferential portion of the auxiliary rod 7A at a position in the circumferential direction that corresponds to the second spherical body 68 of the second open/shut detection valve mechanism 61. The second engagement portion 69 is formed on the external circumferential portion of the auxiliary rod 7A from near its upper end to a portion at approximately two thirds along its length, and, when the piston member 4A has been shifted downward from its unclamp position (i.e. from its upper limit position) by at least a small set distance and is in the clamped state, it is arranged for the second spherical body 68 to be partially engaged with the second engagement portion 69.

The operation of the twist-type clamp device LA explained above and the beneficial effects will now be explained.

When the piston member 4A of the clamp device 1A is in its unclamp position (i.e. its upper limit position, its movement limit position), as shown in FIG. 13 and FIG. 17, in a similar manner to the case with the first embodiment, since the first spherical body 38 of the first open/shut detection valve mechanism 11A engages to the first engagement portion 39 and the first open/shut detection valve mechanism 11A goes into the closed position and intercepts the air passage 32, accordingly, by receiving the detection signal of the pressure switch 41A, it is possible for the control unit to detect that the clamp device is in the unclamped state. Moreover, when the piston member 4A shifts downward from its unclamp position, as shown in FIG. 19 and FIG. 22, with the first spherical body 38 no longer being engaged to the first engagement portion 39, the first valve body 36 is pushed upward and engages to the first concave engagement portion 37, so that the valve open state is established.

In the second open/shut detection valve mechanism 61, when the piston member 4A is in its unclamp position, as shown in FIG. 13 and FIG. 16, since the second spherical body 68 is engaged to the second concave engagement portion 67 without being engaged to the second engagement portion 69, accordingly the second spherical body 68 presses the second valve body 66 slightly upward, so that the open state of the valve is maintained. Due to this, by receiving the detection signal of the pressure switch 41B, it is possible for the control unit to detect that the clamp device is in the unclamped state.

Next, when the piston member 4A shifts downward from its upper limit position by at least the abovementioned set distance and goes into its clamp position, as shown in FIG. 19 and FIG. 21, since, in the second open/shut detection valve mechanism 61, the second spherical body 68 engages to the second engagement portion 69 and the second spherical body 68 permits downward shifting of the second valve body 66, accordingly the second open/shut detection valve mechanism 61 goes into the closed state. Due to this, by receiving the detection signal of the pressure switch 41B, it is possible for the control unit to detect that the clamp device is in the clamped state.

Since the second engagement portion 69 is formed as a single long groove that extends in the vertical direction, accordingly it is possible for this clamped state to be reliably detected by the second open/shut detection valve mechanism 61, even if a workpiece of great thickness has been clamped, or, conversely, even if a workpiece of small thickness has been clamped.

Moreover, since the first and second open/shut detection valve mechanisms 11A, 61 are installed within the cylinder main body 10A, accordingly it is possible to make the fluid pressure cylinder 2A and the clamp device 1A more compact.

Also, since in this construction the first and second engagement portions 39, 69 are formed on the auxiliary rod 7A, and the first and second open/shut detection valve mechanisms 11A, 61 are operated to open and close together with the auxiliary rod 7A, accordingly it is possible to make the first and second open/shut detection valve mechanisms 11A, 61 open and close together with the operation of the piston member 4A, even with a simple structure.

Variant examples in which the second embodiment is partially altered will now be explained.

Figure 23:
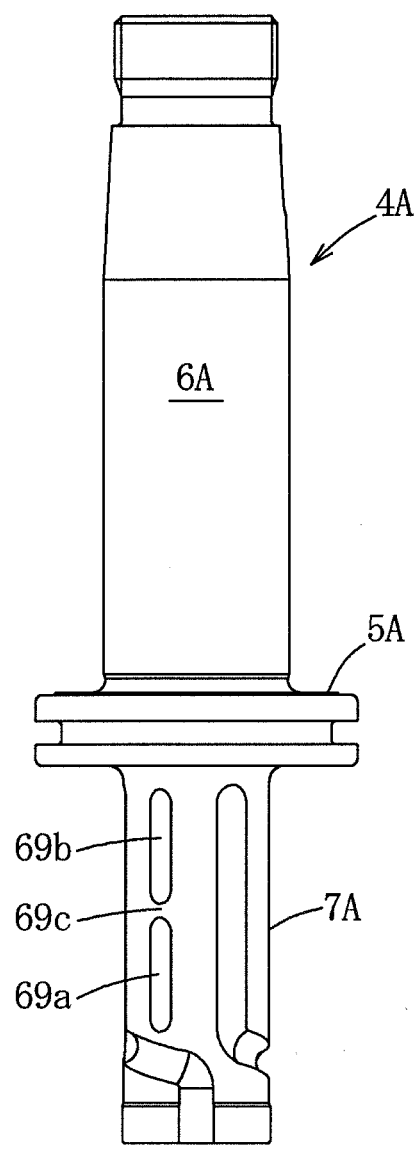
FIG. 23 is an elevation view of a piston member according to a variant of the second specific embodiment.

(1) As shown in FIG. 23, instead of the second engagement portion 69 described above, it would also be acceptable to arrange to form two vertical grooves 69a, 69b arranged end to end along the vertical direction of the external circumferential portion of the auxiliary rod 7A. When clamping a workpiece of great thickness, for detection of the clamped state, the second spherical body 68 is engaged into the lower one 69a of these vertical grooves. Moreover, when clamping a workpiece of small thickness, for detection of the clamped state, the second spherical body 68 is engaged into the upper one 69b of these vertical grooves. It is supposed that, if the second spherical body 68 engages to the land portion 69c between the vertical grooves 69a, 69b and is stopped thereby so that the valve open state is maintained, then an error notification is issued because of that an attempt has been made to clamp a workpiece other than those to be clamped.

Moreover, it should be understood that, instead of the two vertical grooves 69a, 69b mentioned above, it would also be acceptable to provide three or more vertical grooves formed in sequence along the vertical direction of the external circumferential portion of the auxiliary rod 7A.

(2) The variant examples (1) and (3) through (5) of the first embodiment can also be employed for the first open/shut detection valve mechanism 11A, in a similar manner.

(3) The variant examples (3) through (5) of the first embodiment can also be employed for the second open/shut detection valve mechanism 61, in a similar manner.

(4) The hydraulic pressure cylinder 2A of the present invention could also be applied to various clamp devices other than the twist-type clamp device 1A.

DESCRIPTION OF NUMERALS 1, 1A: twist-type clamp devices
2, 2A: hydraulic pressure cylinders
4, 4A: piston members
5, 5A: piston portions
6, 6A: output rods
7, 7A: auxiliary rods
8: twisting mechanism
10, 10A: cylinder main bodies
11, 11A: first open/shut detection valve mechanism
12a: unclamp hydraulic pressure operating chamber
12b: clamp hydraulic pressure operating chamber
13: base member
21: installation hole
22: lower installation hole portion
23: upper installation hole portion
32, 32A: first air passages
35: first valve body reception hole
36: first valve body
37, 37M: first concave engagement portions
38: first spherical body
39, 53, 53A: first engagement portions
55: compression spring
61: second open/shut detection valve mechanism
62: second air passage
65: second valve body reception hole
66: second valve body
67: second concave engagement portion
68: second spherical body
69, 69a, 69b: second engagement portions
70: compression spring
73: small diameter rod portion

The invention claimed is:

1. A fluid pressure cylinder comprising a cylinder main body in which a cylindrical hole is formed, a piston member having a piston portion movably received in the cylindrical hole and an output rod that extends from the piston portion to the exterior of the cylinder main body, and a fluid pressure operation chamber formed in the cylindrical hole, comprising:
 an auxiliary rod that extends from the piston portion in an opposite direction to the output rod;
 a rod insertion hole that is formed in the cylinder main body so as to communicate with the fluid pressure operation chamber and into which the auxiliary rod can be inserted;
 a first open/shut detection valve mechanism, installed in the cylinder main body; and
 a first fluid passage formed in the cylinder main body so as to be opened and closed by the first open/shut detection valve mechanism;
 wherein the first open/shut detection valve mechanism comprises:
 a first valve body reception hole that is formed parallel to an axis of the cylindrical hole in the cylinder main body, and is communicated with the fluid pressure operation chamber;
 a first valve body that is movably received in the first valve body reception hole and has a first concave engagement portion on an external circumferential portion thereof;
 a first spherical body that is movably fitted in the cylinder main body and is capable of engaging to the first concave engagement portion;
 and
 a first engagement portion formed on the auxiliary rod and to which the first spherical body can engage;
 wherein, when fluid pressure is charged into the fluid pressure operation chamber and the piston member has reached its movement limit position, the first valve body receives a fluid pressure in the fluid pressure operation chamber, and a portion of the first spherical body is engaged to the first engagement portion and the first valve body is changed over to a valve-closed position; and when the piston member has shifted from its movement limit position, the first spherical body does not engage with the first engagement portion and engages with the first concave engagement portion so that the first valve body maintains a valve-open position.

2. The fluid pressure cylinder according to claim 1, wherein a closed state of the first open/shut detection valve mechanism is detected via fluid pressure supplied to the first fluid passage.

3. The fluid pressure cylinder according to claim 1, wherein the first engagement portion is formed as an annulus on an external circumferential portion of the auxiliary rod.

4. The twist-type clamp device, in which a twisting mechanism is provided to the auxiliary rod and the cylinder main body of the fluid pressure cylinder according to claim 1, the twisting mechanism operating together with a forward and backward movement of the output rod to twist the output rod through a set angle around its axis, and in that a clamp arm is provided at an end portion of the output rod.

5. The twist-type clamp device according to claim 4, wherein the output rod is formed so as to extend from the piston portion upward to the exterior of the cylinder main body; and the fluid pressure operation chamber is formed on a lower side of the piston portion, and the movement limit position of the piston member is an unclamp position in which the piston portion is positioned at its upper limit position.

6. The twist-type clamp device according to claim 5, comprising:

a second open/shut detection valve mechanism, installed in the cylinder main body; and a second fluid passage formed in the cylinder main body and opened and closed by a second open/shut detection valve mechanism;

wherein the second open/shut detection valve mechanism comprises:

a second valve body reception hole that is formed parallel to the axis of the cylindrical hole in the cylinder main body, and is communicated with the fluid pressure operation chamber;

a second valve body that is movably received in the second valve body reception hole and has a second concave engagement portion on an external circumferential portion thereof;

a second spherical body that is movably fitted in the cylinder main body and is capable of engaging to the second concave engagement portion;

a second engagement portion formed on the auxiliary rod and to which the second spherical body can engage; and a compression spring that biases the second valve body toward a closed position;

wherein, when the piston member is in its unclamp position, the second spherical body does not engage with the second engagement portion and engages with the second concave engagement portion so that the second valve body maintains a valve-open position; while, when the piston member is in its clamp position in which the piston member has been lowered below its unclamp position, the second spherical body engages with the second engagement portion and the second valve body is changed over to its valve-closed position.

7. The twist-type clamp device according to claim 6, wherein the second engagement portion consists of a single vertical groove formed on an external circumferential portion of the auxiliary rod.

8. The twist-type clamp device according to claim 6, wherein the second engagement portion consists of two vertical grooves formed in sequence along a vertical direction on an external circumferential portion of the auxiliary rod.

9. The twist-type clamp device according to claim 4, wherein an installation hole into which a lower portion of the clamp main body is inserted from above and installed is formed in a base member to which the twist-type clamp device is fitted; the installation hole consists of a lower installation hole portion and an upper installation hole portion that is of slightly larger diameter than the lower installation hole portion; and a lower end side portion of the clamp main body and a seal member fitted on an external circumferential portion of the lower end side portion of the clamp main body is installed in the lower installation hole portion.

10. The twist-type clamp device according to claim 9, further comprising a compression spring that biases the first valve body toward its open side.

* * * * *